(12) United States Patent
Hollander et al.

(10) Patent No.: US 7,537,381 B2
(45) Date of Patent: May 26, 2009

(54) MEASUREMENT SYSTEM AND METHOD

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 79 days.

(21) Appl. No.: 11/259,830

(22) Filed: Oct. 27, 2005

(65) Prior Publication Data

US 2006/0050766 A1   Mar. 9, 2006

Related U.S. Application Data

(63) Continuation-in-part of application No. 11/000,868, filed on Dec. 1, 2004.

(51) Int. Cl.
*G01K 11/00*   (2006.01)
*G01J 5/00*   (2006.01)

(52) U.S. Cl. .................... 374/142; 374/121; 374/131

(58) Field of Classification Search ................. 374/121, 374/142, 131
See application file for complete search history.

(56) References Cited

U.S. PATENT DOCUMENTS

| 4,300,823 | A | * | 11/1981 | Yamanaka et al. | .......... 396/106 |
|---|---|---|---|---|---|
| 4,343,182 | A | * | 8/1982 | Pompei | ...................... 374/31 |
| 4,948,258 | A | * | 8/1990 | Caimi | ........................ 356/603 |
| 5,823,679 | A | * | 10/1998 | Hollander et al. | ........... 374/121 |
| 7,093,974 | B2 | * | 8/2006 | Kienitz | ...................... 374/121 |
| 2004/0196888 | A1 | * | 10/2004 | Musbach et al. | ............ 374/120 |

* cited by examiner

*Primary Examiner*—Gail Verbitsky
*Assistant Examiner*—Mirellys Jagan
(74) *Attorney, Agent, or Firm*—William A. Drucker

(57) ABSTRACT

A radiometer includes a sighting system which generates an image of an area on the surface of an object onto the IR detector. The distance between the object surface and the radiometer is measured by a rangefinder, controlled by the radiometer. From the distance one can calculate the size of the energy zone on the surface, as materialized on a radiometer sighting system display.

1 Claim, 11 Drawing Sheets

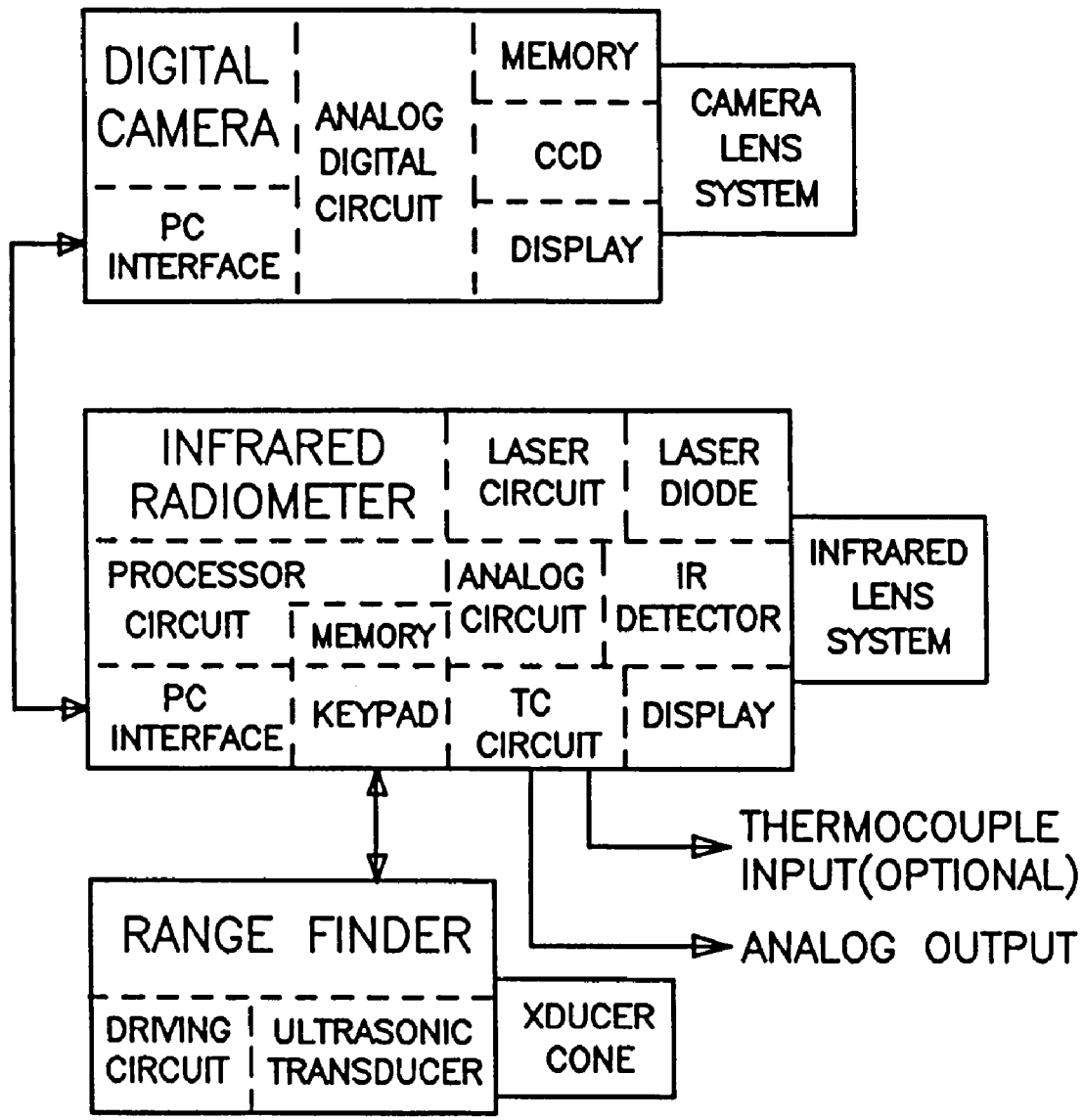
FIG 13 — FUNCTIONAL BLOCK DIAGRAM
RANGE FINDER & DIGITAL CAMERA
ARE SEPARATE MODULES

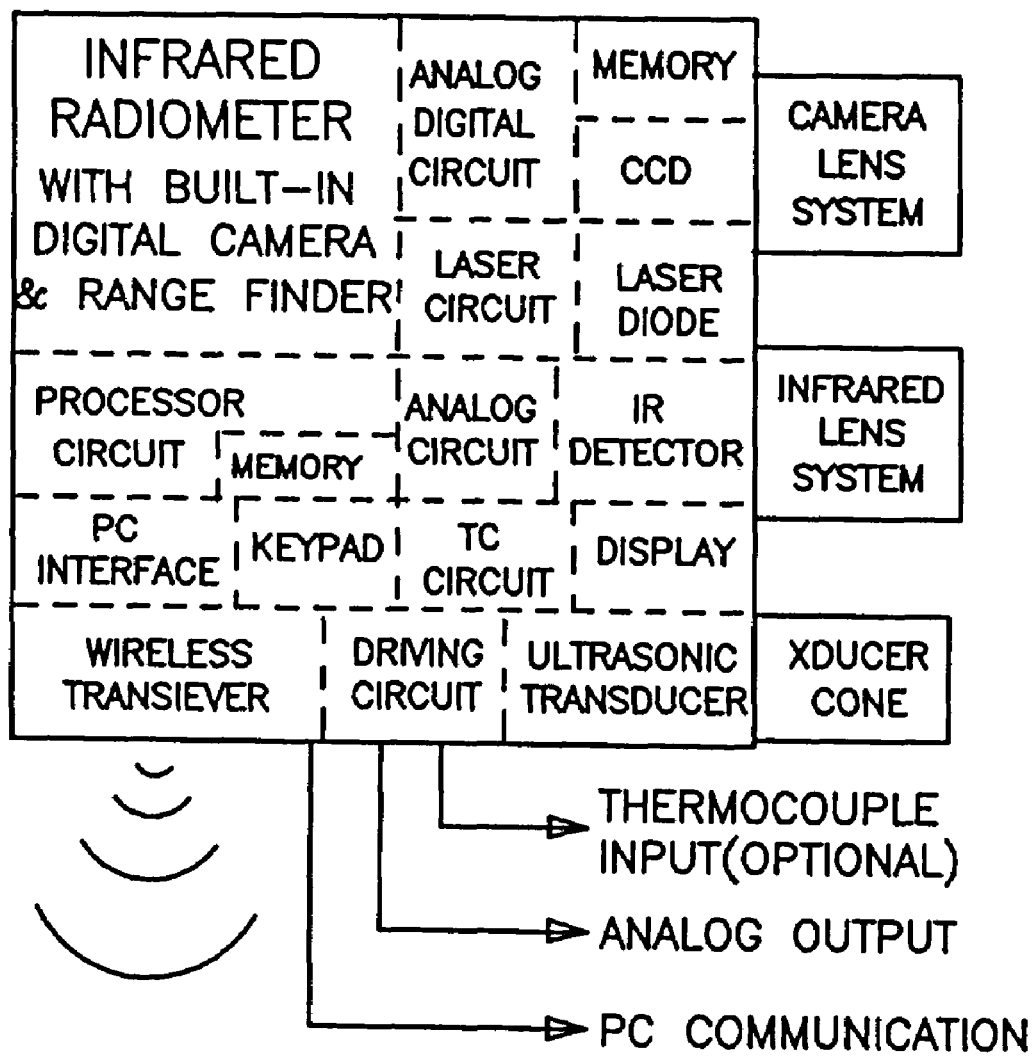
FIG 14 – FUNCTIONAL BLOCK DIAGRAM INFRARED RADIOMETER WITH BUILT-IN DIGITAL CAMERA, RANGE FINDER & WIRELESS TRANSIEVER

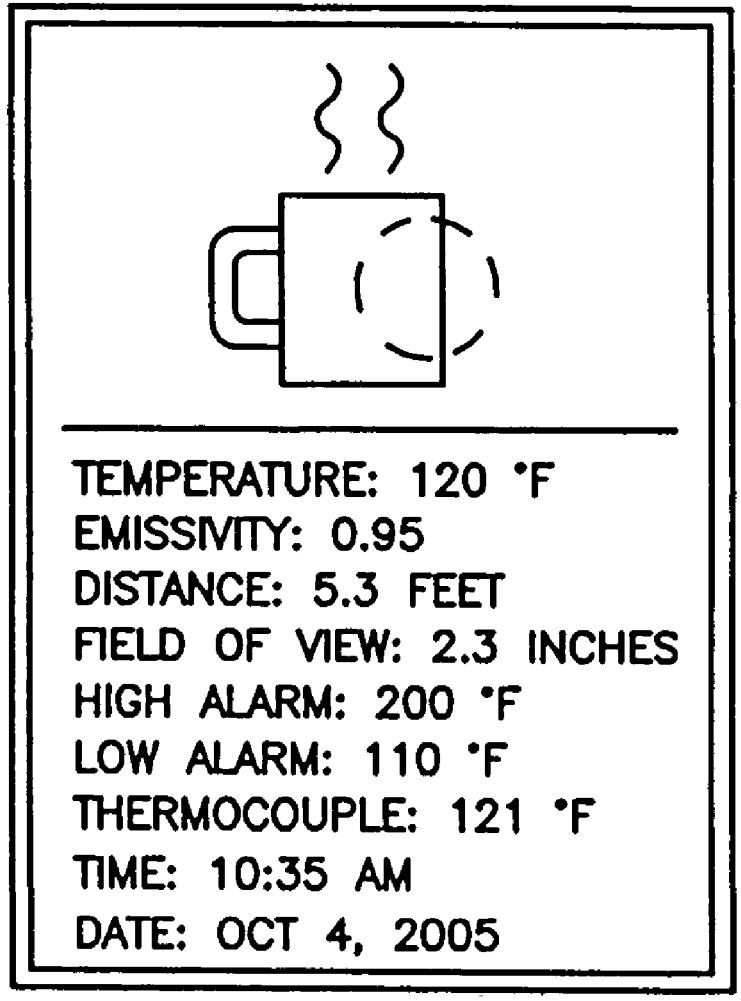
FIG 15 – A TYPICAL DIGITAL PICTURE DISPLAY WITH RELATED TEMPERATURE INFORMATION

MEASUREMENT SYSTEM AND METHOD

RELATED APPLICATIONS

This Application is a continuation-in-part of co-pending U.S. application Ser. No. 11/000,868 filed Dec. 1, 2004.

FIELD OF THE INVENTION

The present invention relates to a hand held thermometer instrument for measuring the temperature of a surface remote from the thermometer without physical contact by the instrument and by detection of infrared radiation originating on an identified area of the measured surface to produce a temperature display from a surface and to a method of measurement.

BACKGROUND OF THE INVENTION

The invention relates to devices and to systems and to methods for remote or non-contact temperature measurement. Such devices are known in temperature measurement art as radiometers or as pyrometers or infrared cameras. They comprise a detector for receiving infra red heat radiation emanating from an energy zone on the surface of an object of measurement, an infra red (IR) optical system for imaging the heat radiation emanating from the energy zone onto the detector; and a sighting system for identifying the position and size of the energy zone on the surface of the object of measurement by visible light display. A further processing means associated with the detector converts the detector signal into a temperature indication and may also produce a temperature display upon the radiometer. The method of the invention includes the steps of measuring the distance between the radiometer and the target surface; and converting the measured distance by a calculation in the radiometer into a value, which represents the size of the radiometer optical field of view, and which is used to identify the extent of the energy zone which may also be displayed.

An IR optical sub-system is designed so that at a particular distance between the radiometer and the target surface, for the most part, heat from a known and identified area of the surface of the object of measurement, namely, the energy zone, is focused onto the detector. In the usual case the term energy zone is defined as the area from which about 90% of the heat rays focused onto the detector are emitted. In other cases the amount may be between about 50% and a value up to 100% of the heat.

The pattern of the dependence of the size of the energy zone upon the measurement distance depends upon the design of the IR optical system. There is a recognized relation between the measured distance from the radiometer to the energy zone on the surface of measurement and the respective size of the optical field of view of the radiometer. The measurement of distance is used to calculate the size of the optical field of view. Focus may be done manually or by a known auto-focus means.

In non-contact temperature measurement methods under practical conditions, the energy zone on the surface of the object to be examined should be made visible to the device operator in a suitable way, i.e., by a sighting system. For example, in U.S. Pat. No. 5,368,392 various light projection sighting methods of outlining the energy zone using laser beams are described. Such methods include: use of a laser beam to identify the center of the energy zone and/or use of a beam splitter to produce from a single laser several separate static laser beams which may surround the energy zone with multiple illuminated static points of light; and also include use of a single moving or dynamic laser beam to circumscribe the zone. Multiple separate lasers may be used to produce separate sighting beams.

BRIEF SUMMARY OF THE INVENTION

In a preferred embodiment and in the best known mode of realizing the invention, a hand held radiometer is mounted as a component of a measurement system on a common support with both (a) a laser imaging means and (b) a rangefinder which measures the distance between a measurement surface and the radiometer. The radiometer optical system field of view size is determined from the distance between the radiometer and the energy zone on the surface and is imaged onto the radiometer detector; and a temperature display is calculated in the radiometer software from the amount of energy detected from the target and from the target emissivity. The distance measurement reveals size of the energy zone and the field of view of the optical system, collecting heat radiation from the energy zone. A rangefinder on the radiometer, projects preferably an ultrasonic beam or wave onto the measurement surface and detects the sonar delay of the resulting echo from which the distance between the radiometer and the target is calculated. The surface image and measured values may be captured by a digital camera. There may thus be produced a display of the energy zone and the measurement surface as well as date, time, distance and temperature.

EXAMPLE

In an example of the invention the measurement system comprises:

An infrared radiometer including:

An optical sub-system which collects IR radiant energy from the target surface and focuses the energy onto the IR detector component. The optical sub-system is designed to be either convergent or divergent. In a divergent optical system the optical field of view diameter increases with increased distance from the radiometer to the target surface. In a convergent optical system the field of view diameter decreases and reduces to a minimum size at a fixed distance. The optical field of view at this distance is known as the "spot size" and the optical field of view increases to be larger than the spot size at any other distance. In both types of optical field of view design the field of view size is known as the ENERGY ZONE, where typically 90% of the IR energy is collected (by definition) from the target surface and is focussed onto the detector. Assuming the target surface has a uniform constant temperature, the collected energy is constant and independent of the distance between the radiometer and the surface so long as the filed of view size of the radiometer at a particular distance is equal to or smaller than the target surface area; and A laser sighting sub-system designed to project a laser light pattern onto the target surface. The pattern indicates the size and location of the radiometer optical field of view at a particular distance to the target surface and shows the size and location of the energy zone; and A range finder sub-system designed to measure the distance between the radiometer and the target surface. The range finder operates with either optical or acoustic technology to measure distance. The range finder is either integral with the radiometer device or is a connectable stand alone construction; and An electronic sub-system comprising an analog circuit front end to receive the output of the detector and range finder and in which a digital portion includes a processor and a display. Additional elements include a keypad, PC connection (RS232, USB or Ethernet), or analog output. The processor takes the detector output, the ambient temperature and the target surface emissivity and calculates and displays target temperature; the processor takes the output of the range finder and calculates and displays the distance between the radiometer and the target surface. The keypad interfaces with the processor and can stop or start distance measuring. From the distance value the processor calculates and displays the field of view size of the radiometer at the measured distance and thus the size (diameter) of the energy zone at a distance to the target surface. This is done from the optical chart data of the radiometer stored into the processor memory. Because of the stored chart data, the processor can calculate the distance from the optical field of view size data, independently of the range finder. Thus target distance is calculated from the stored chart data solely from the size of the energy zone.

The optical field of view and size data can be used in or by the processor for special functions, such as alarms. For example, distance can be "set" on the device so that a signal is given at "set" distances. Field of view size can be "set" to provoke an alarm signal; also temperature measurement can start/stop at particular set distance or field of view size, together with audible or visual alarm activation. The processor logs temperature data vs. distance to the target surface vs. real time; and A digital optical sub-system displays an image of the target area from which the radiometer collects radiant energy, i.e., the energy zone. The digital image can also show the laser light pattern projected onto the zone which indicates the size and location of the zone on the target surface. The image can also display information about date, time, temperature, distance, field of view size, and alarm settings. The image can be in real time and/or can be stored as a snap shot. With sufficient digital camera memory one can record a video of the measuring event over a selected time period. The digital camera includes a PC interface to transmit stored images, videos or pictures in real time. The digital display is selectably separate from or integral with the radiometer system; the PC interface is either wired or wireless (RS232, Ehternet or USB); and allows for two way broadcast communication with another transceiver or PC.

In another embodiment of the invention, optical distance is established by triangulation. In a first method one may use a laser beam and an offset position light sensitive diode. Another second optical rangefinder method relies on establishing split congruent images, aligned as in photography. Thirdly, laser scan technology as described hereinafter (FIGS. 4-6) may also be used for measurement. Fourthly, alternatively, radar systems may be used to locate the distance from the radiometer of the energy zone on the target area.

BRIEF DESCRIPTION OF THE DRAWINGS

FIG. 13 sows a functional block diagram of an infrared radiometer in combination with a separate digital camera and rangefinder which all interface electronically. The radiometer display shows the target distance from the range finder and the digital camera shows the temperature and distance data on a target image;

FIG. 14 shows a functional block diagram of an infrared radiometer system with an integral digital camera, range finder and wireless transceiver. In this system configuration, the radiometer display is replaced by a camera display. The display is managed from a keypad. The digital camera sensor (Charge Coupled Device-CCD) and the ultrasonic transducer are part of the same unit. The infrared optical sub-system is separate from the camera optical system. The unit has PC and wireless communication features;

FIG. 15 shows a diagram of a typical image of a target including a projected laser light spot pattern indicating the location and size of the energy Zone. Further information is electively displayed including temperature, emissivity, distance to target, field of view size, alarm set points, thermocouple temperature, ambient temperature, time and date.

DETAILED DESCRIPTION OF THE INVENTION

Reference is now made in detail to several embodiments of the invention. Some examples of different embodiments of the invention are illustrated in the accompanying Drawing. It is not intended to limit the invention to any particular embodiment; and the invention includes the physical device/system construction and/or method of execution of the concept of temperature measurement and/or control by determination of the radiometer optical field of view from the measured distance between the radiometer and the energy zone on the target surface. Alternatives, modifications and equivalents are included in the spirit of the invention within the scope of the appended claims. The present invention may be practiced notwithstanding the omission or addition of other features beyond the concept of temperature detection by a radiometer based upon determination of the optical system field of view from the distance between the radiometer and the target surface.

Figure 1:
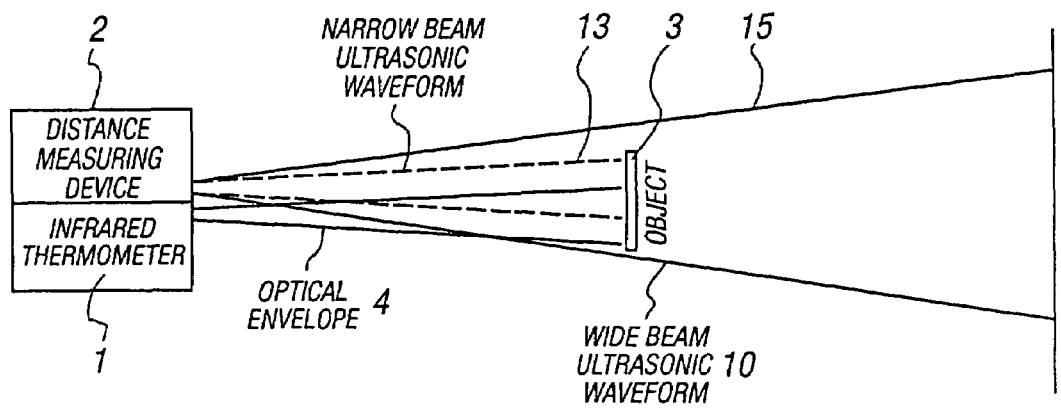
FIG. 1 is a schematic illustration of one embodiment of the invention.
Figure 2:
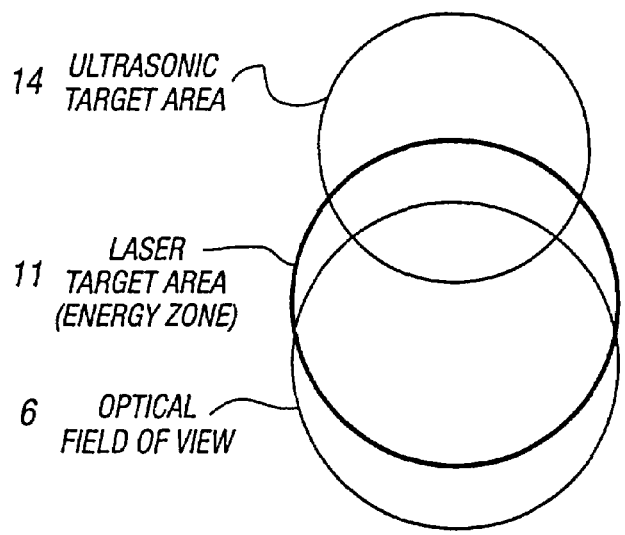
FIG. 2 shows on an enlarged scale, the outline of tie field of view of the radiometer of FIG. 1 and the outlines of the target areas of the associated laser sighting device and the distance measuring device on the target surface of an object of measurement.
Figure 3:
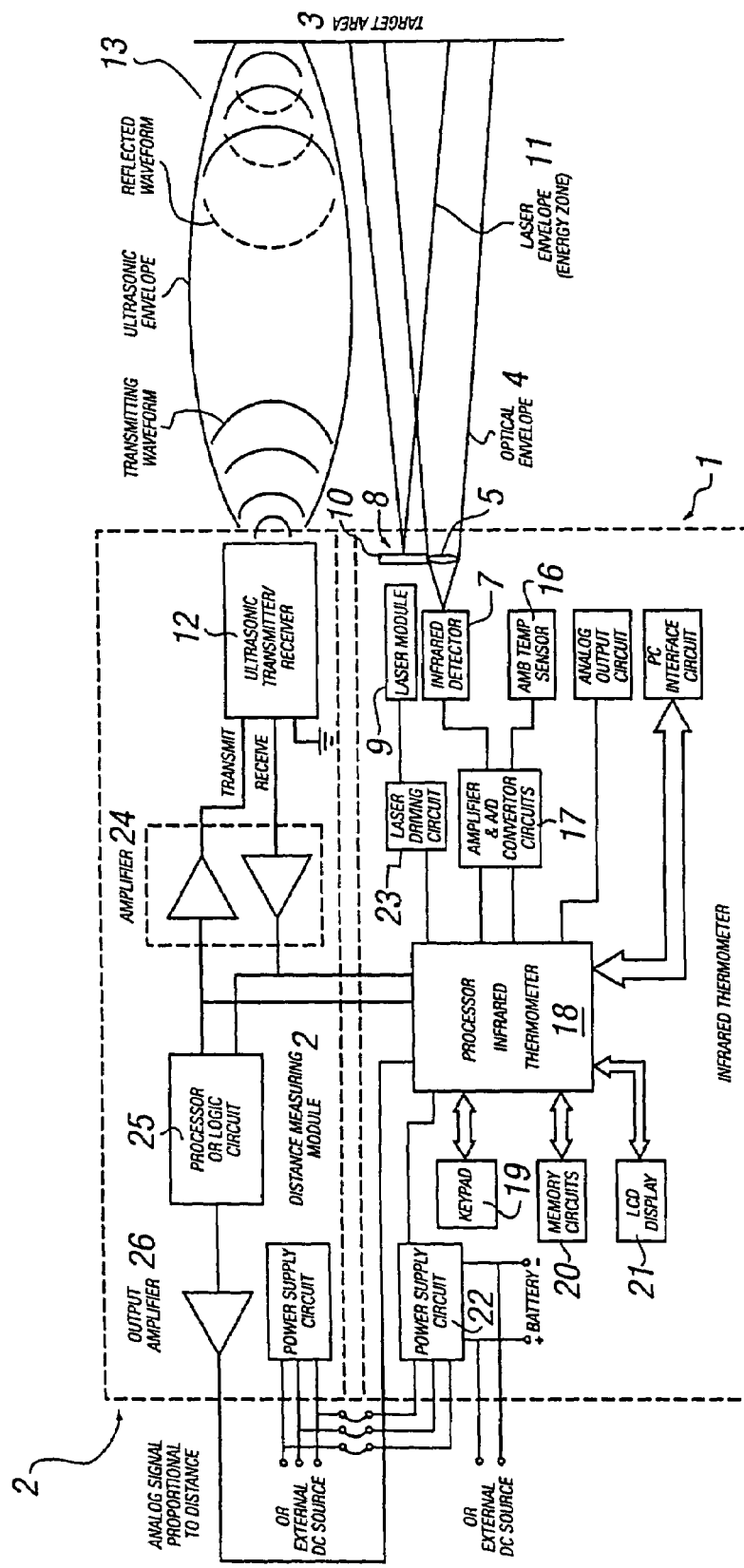
FIG. 3 is a schematic circuit diagram of the radiometer of FIG. 1.

In FIGS. 1-3 is shown schematically a portable, battery operated, hand-held, remote, i.e., non-contact, infrared thermometer 1 provided with a distance measuring device 2. The radiometer is aimed by the user at a target area on a surface 3 to measure the temperature thereof. The radiometer optical envelope 4 represents the field of view of the optical system 5 of the radiometer 1 which determines the shape and size of the energy zone 6 (FIG. 2) on the target surface 3, wherefrom the temperature is sensed and averaged by the radiometer infrared detector 7. The radiometer includes a laser sighting device 8 which comprises a laser module 9 and an associated optical system, such as a diffraction grating beam splitter 10, which projects laser light onto the target surface to define a laser indicated target area or ring pattern 11 of visible light which indicates an approximate outline of the energy zone 6. The ring 11 may be discontinuous and composed of separated light spots, or may appear as a continuous ring pattern, such as will be produced by a moving laser beam.

In the embodiment illustrated in FIGS. 1-3, the sighting device 8 is built into the radiometer 1, although the sighting device may comprise an independent module mounted upon the radiometer. Similarly, the distance measuring device 2 is shown as a separate module or accessory mounted on the radiometer, but could alternatively be built into the radiometer. Likewise, a digital still or video camera is mounted on the radiometer and/or operated separately to capture an image of the surface under investigation and linked to display the distance from the surface and the temperature with an indication of the current time and date.

The distance measuring device 2 in the embodiment of FIGS. 1-3 incorporates a narrow beam ultrasonic transmitter/receiver or transducer 12, so that the narrow ultrasonic beam 13 pinpoints a small area 14 on the target surface 3 at a distance. It is intended that the distance measuring device should target approximately the same area as the radiometer field of view which is set to define approximately the energy zone 6.

When the axes of the radiometer, the sighting device and the distance measuring device are not coaxial and are fixed, they will not necessarily be coincident at the target surface, as seen in FIG. 2. Whether or not such a parallax error occurs, and the extent of such an error, depends upon the radiometer-to-target distance.

As seen in FIG. 3, outputs from the infrared detector 7 and an ambient temperature detector 16 are fed via amplifier and analogue-to-digital converter circuits 17 to a processor 18 connected to a keypad 19, memory circuits 20 and an LCD display 2, and also to a power supply circuit 22 which powers the radiometer, the sighting device and other associated elements including distance measurement.

The laser module 9 of the sighting device is connected via a laser driving circuit 23 to the processor 18 so that the sighting device is activated and deactivated under control of the processor.

The ultrasonic transmitter/receiver 12 of the acoustic distance measuring device 2 is connected via amplifiers 24 to a processor or logic circuit 25, and to the radiometer processor 18 so that the distance measuring device is activated and deactivated under control of the processor 18. The output of the processor or logic circuit 25 comprises an analogue signal proportional to he measured distance, which is fed via an output amplifier 26 to the radiometer processor 18. The processor 18 processes the distance-to-target measurement data, calculates the field of view size/diameter at the measured distance and, under control of the keypad 19 displays the distance, field of view and temperature data simultaneously or sequentially on LCD display 21.

As earlier discussed, in addition to providing visual display, distance measurement data can be used to effect adjustment or control of the radiometer, sighting device, and/or distance measuring device and may provide auto-focus of the radiometer and/or operate a digital camera which captures the target on a display.

Figure 4:
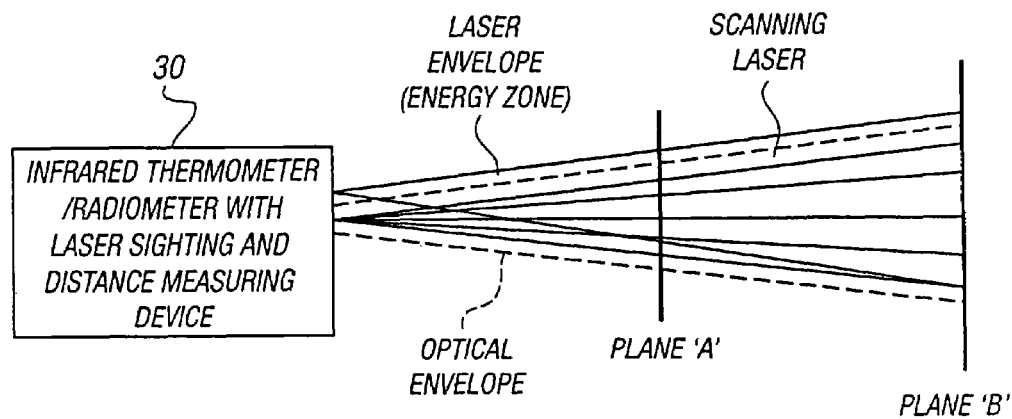
FIG. 4 is a schematic illustration of a second embodiment of a radiometer.
Figure 5:
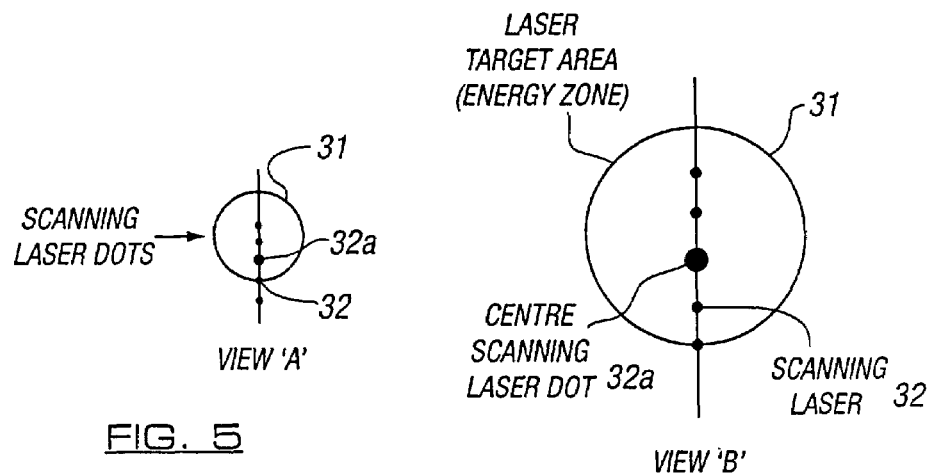
FIG. 5 represents views taken in the planes "A" and "B" of FIG. 4 showing the laser beams of the laser sighting device and of the distance measuring device associated with the radiometer of FIG. 4, when the distance measuring device uses laser dot scan technology.
Figure 6:
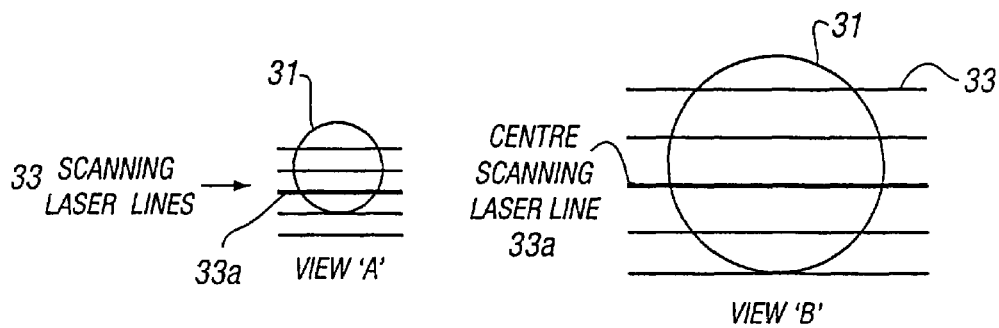
FIG. 6 shows views similar to FIG. 5, wherein the distance measuring device employs laser line scan technology.

In the embodiments seen in FIGS. 4-6, in place of acoustic ultrasound technology, distance may be measured by optical laser scan technology. The laser sighting means and the distance measuring means are integrated with the radiometer to form a single unit 30. As seen in FIGS. 5 and 6 the laser sighting means generates a light ring or circle 31 which outlines or indicates the field of view (including the energy zone) 6 of the radiometer as also seen in FIGS. 1-3. Depending upon whether the target surface is located at plane "A" or at plane "B" in FIG. 4, the light circle 31 will be sized as seen in View "A" or in View "B" in FIG. 5 or 6. The distance measuring means incorporates a second laser or laser pattern which is scanned across the laser light circle 31. The scanned laser pattern is in the form of a series of visible laser spots or dots 32 seen in FIG. 5, or a series of parallel visible lines 33 seen in FIG. 6, superimposed on the light circle pattern 31. The center scanned laser dot 32a or line 33a is clearly identifiable from the other dots or lines in series. Since the axes of the sighting means and distance measuring means are mutually offset vertically and inclined, as apparent from FIG. 4, the position of the series of dots/lines will move relative to the circle 31 depending upon the distance-to-target, as is apparent from a comparison of View "A" and View "B" in FIGS. 5 and 6. Each scanned dot 32 or line 33 represents a specific distance. For example, one dot/line below the center dot 32a or line 33a (View "A") could represent six feet, two dots/lines below the center dot/line (View "B") could represent twelve feet. By this means, distance can be measured by determination of how many scanned dots or lines the energy zone covers.

Figure 7:
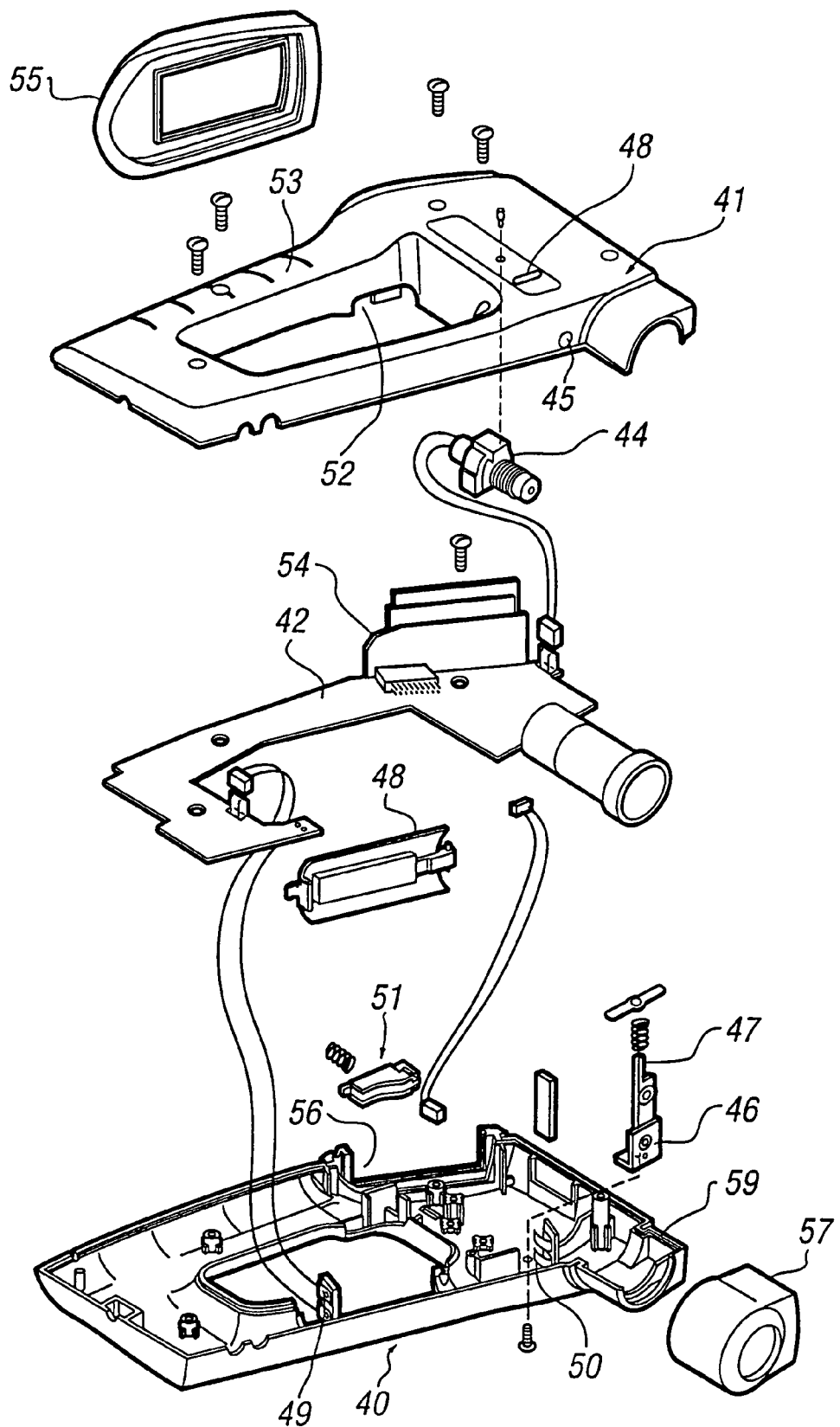
FIG. 7 is an exploded perspective view, in greater detail, of a presently preferred embodiment of the invention, showing a radiometer incorporating the circuitry of FIG. 3 with the distance measuring feature omitted for clarity.
Figure 8:
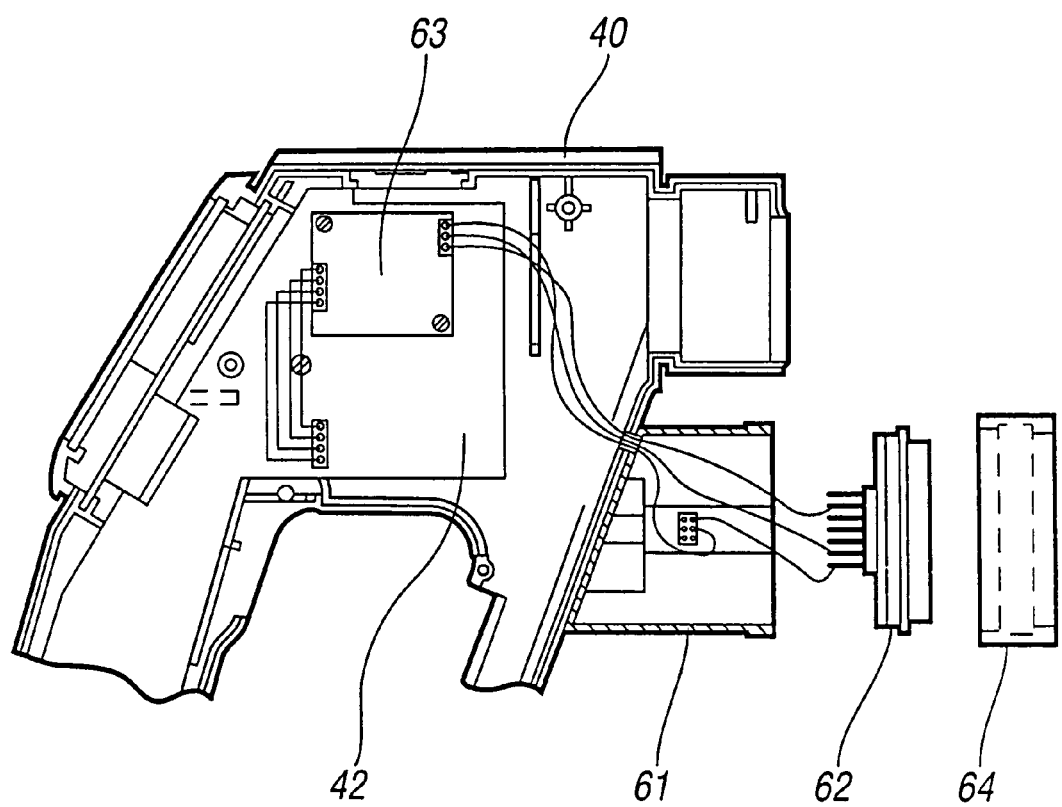
FIG. 8 is an enlarged fragmentary side view of the lower or left hand body shell and main circuit board of the radiometer seen in FIG. 7 showing a distance measuring device.

FIGS. 7 and 8 illustrate a preferred embodiment of the invention which incorporates the circuitry of FIG. 3. The radiometer includes body shell elements 40 and 41, i.e., a lower shell element 40 and an upper element 41, as viewed in FIG. 7. A main electrical circuit board 42 is sandwiched between the assembled shells. The main board 42 carries the processor 18 and associated thermometer circuitry of the radiometer 1, as seen in FIG. 3, or which is analogous to that seen in FIG. 3. The main board also carries a radiometer optical system 43 incorporating an infrared detector (not shown connected to the main board circuitry. Alternatively, the detector be mounted on the main board 42 separately from and in axial alignment with the optical system 43.

A laser sighting device includes a laser module or generator 44 carried by the shell 41 and located below the radiometer optical system 43 with its optical axis aligned with an opening 45 in the shell. The optical system of the laser sighting device includes a laser beam modifying switch assembly 45, incorporating a diffraction grating, which is carried by the shell 40, and is located in the path of the laser beam between the laser module 44 and opening 45. The switch assembly is manually operable, via a lever 47 projecting through a slot 48 in the shell, so that it may be selected that either a single laser beam is projected through the opening to produce a single high intensity bright light dot or spot near the center of the energy zone on a target surface, or the beam from the module 44 is modified by the diffraction grating to produce a lower intensity ring of laser light or a ring of separate spaced apart light dots or spots to outline the energy zone.

A battery compartment, accessible via a door 48, is provided between contacts 49 and 50 carried by the shell 40 and wired to the main board circuitry. An on/off trigger switch) assembly 51, also wired to the main board circuitry, is located in cut outs 52 of the hand grip portion 53 of the shells for manually pointing, directing and actuating the radiometer and its associated feature devices, including laser sighting, target distance measuring and digital camera recording means. An LCD display board and function switch/keypad panel assembly 54 is also wired to the main board circuitry. This assembly and associated display bezel 55 are mounted in cut outs 56 at the rear of the hand grip portion 53. A protective resilient lens bezel 57 is fitted over forwardly projecting half bosses 59 of the shells which locate and mount the front end of the radiometer optical system 43.

The radiometer shown in FIG. 7 incorporates a distance measuring device 60 seen in FIG. 8 which is secured to or integrally formed with or detachably mounted upon the front of one or both shells 40, 41, below the laser sighting beam opening 45. The device includes a cylindrical housing 61 at the front end of which is mounted an ultrasonic transducer module 62. In one embodiment, the transducer is a "Mini-A" transducer supplied by SensComp, Inc. of Livonia, Mich., USA, which operates at or above 30 KHz. The transducer module incorporates ultrasonic transmitter/receiver and supporting/drive circuitry to provide analogue voltage output linearly proportional to a measured distance, i.e., the module incorporates the circuitry of the device 2 seen in FIG. 3 or analogous circuitry. The DC power input to, and analogue output from, the module 62 are wired to an associated printed circuit board 63 carried by and wired to the main circuit board 42. The transducer module 62, which is powered and controlled by the radiometer is held detachably at the front of the housing 61 by a resilient, e.g., rubber, boot or bezel 64, which encloses the half bosses 59 which house the radiometer optical system.

Figure 9:
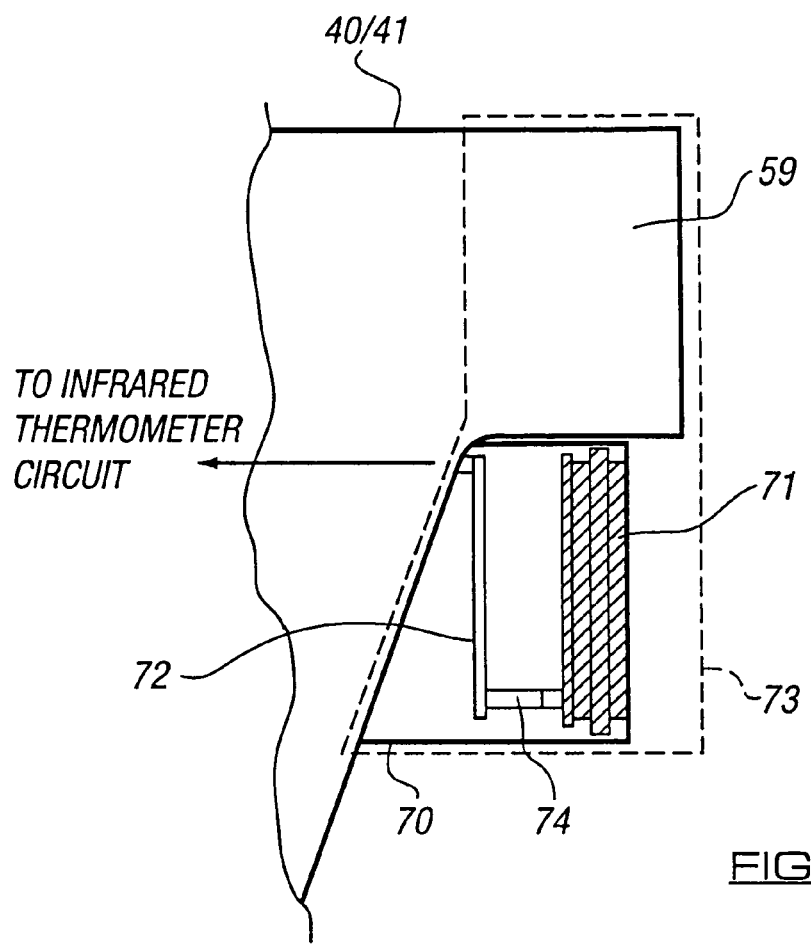
FIG. 9 is a fragmentary schematic side view of the front end of a modified form of radiometer similar to that seen in FIGS. 7 and 8.

In the embodiment of FIG. 9, the distance measuring device or module 70 includes a "600 Series" ultrasonic transducer 71, available from SensCom, Inc., which is connected to an interface circuit board 72 and provided with transducer support/drive circuitry. The board 72 is in turn wired to the radiometer circuitry to provide power and to control the distance measuring module 70. The distance measuring module may be permanently attached to or built into the radiometer.

Figure 10:
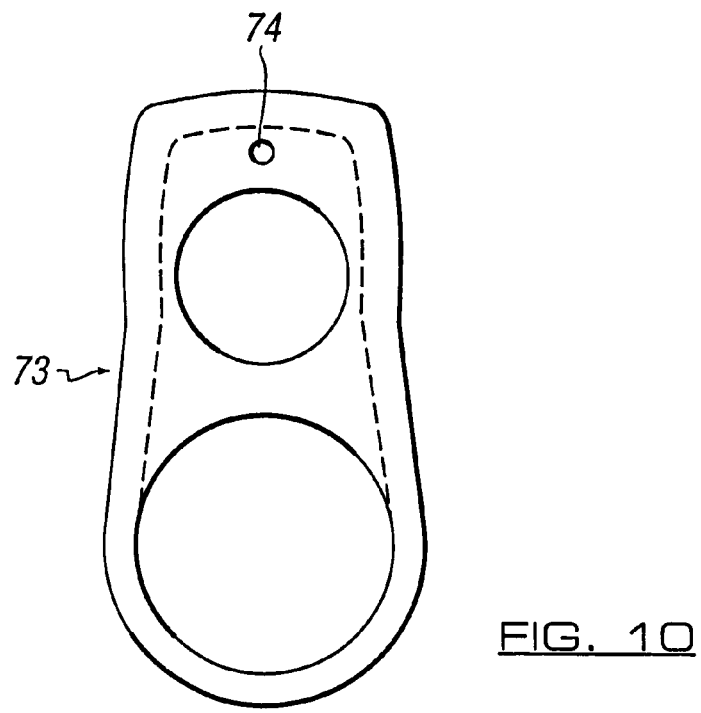
FIG. 10 is a front view of the boot or bezel seen in FIG. 9.

In this embodiment, the laser sighting device (not shown) is arranged to direct a beam or beams through the cavity above the radiometer optical system and through an opening 74 in the boot or bezel 73 seen in FIG. 10.

In the described embodiments, the distance measuring device may function as an auto focus means for adjusting the radiometer optical system to attain the best accurate temperature measurement and also may function in connection with the digital camera.

Figure 11:
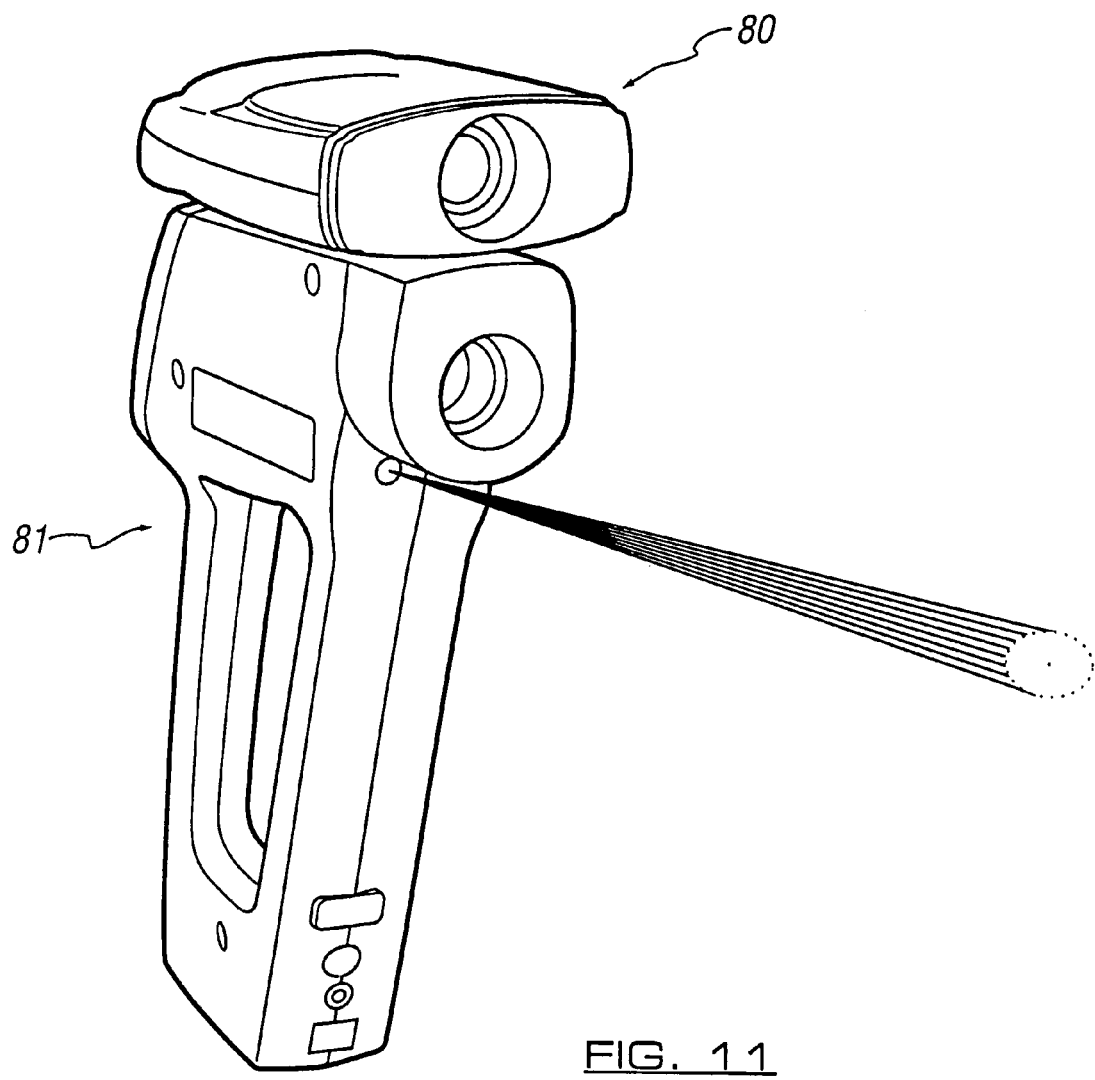
FIG. 11 is a front perspective view of another embodiment of the invention showing a radiometer fitted with a separate detachable distance measuring device which may include a digital or video camera.

In another embodiment seen in FIG. 11, either the distance measuring device and/or digital-camera comprises a self-contained modular unit 80 mounted on the radiometer 81. For attachment a dove tail track or rail (not shown) is provided on the radiometer housing which extends parallel to the optical axis of the radiometer optical system for receiving a sliding shoe (not shown) on the underside of the modular unit 80 which aligns accurately the optical axis of the radiometer with the modular unit. In another embodiment means are provided for the distance measuring device, manually or automatically, to adjust the convergence angle between the optical axes.

The distance measuring unit and/or digital camera unit 80 is electrically connected to the radiometer circuitry by an external cable, and/or by cooperating contacts associated with the shoe and rail, so as to be powered and controlled through the radiometer 3. The digital camera may be connected to and display an image on the LCD 21. When connected by a cable to the radiometer the unit and/or camera can be dismounted from the radiometer. The unit 80 incorporates its own function switch/keypad panel, and LCD display where measured distance is displayed with temperature, time and date in a choice of different engineering units (e.g., inches/centimeters).

Instead of being controlled by the radiometer, the unit 80 can be completely self-contained, incorporating its own power source or connected to an independent power supply. The unit can thus be operated and controlled independently from the radiometer on which it may be mounted. The unit 80 can also be removed from the radiometer and the separate devices controlled and operated simultaneously.

The distance measuring unit or the digital camera may be supplied as a separate accessory to a radiometer or to another device, such as a multimeter, wherein target distance information is useful.

Figure 12:
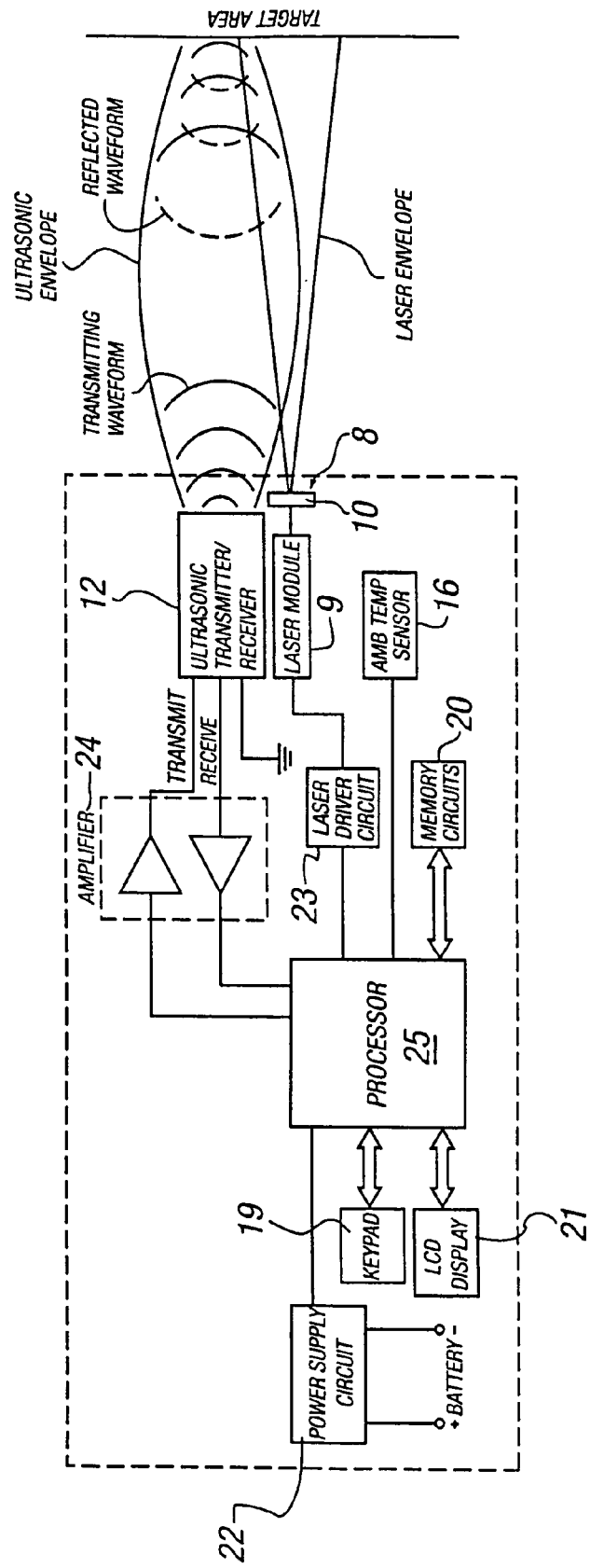
FIG. 12 is a schematic circuit diagram of a detachable distance measuring device, similar to that seen in FIG. 11, which includes a built-in laser sighting device.

In another embodiment seen in FIG. 11, the unit 11 includes its own built-in sighting device seen schematically in FIG. 12. Circuitry and components are similar to FIG. 3 and use like reference characters. The laser feature generates a visible spot, ring or circle to identify the optical field of view of the radiometer. The built-in LCD display 21 shows the distance, ring size and area.

The laser sighting device is used to aim the distance measuring unit and, when attached to a radiometer, which is not provided with its own sighting device is used to aim the radiometer. When the radiometer has its own sighting device, the distance measuring device can be detachably and adjustably mounted on the radiometer, FIG. 11, for automatic or manual operation so that separate beams from multiple laser devices are directable to coincide at the target surface. The laser spots at the target surface may be mutually superposed.

The distance measuring unit preferably uses a narrow beam ultrasonic transducer to measure distances to small target areas within the energy zone.

When the distance measuring unit operates independently of the radiometer, the display generated by the sighting unit indicates the area of the ultrasonic beam at he distance measured. Thus, the focal plane of the distance measuring unit is delineated by the laser display, e.g., by a laser ring. The size of the energy zone can be indicated by the laser display pattern according to the measured distance.

From the above it is apparent that the invention includes both independent and combination features. For example, as applied to combinations of radiometers and distance measuring units, either both, one or neither of the devices may be equipped with integral laser sighting means. Laser sighting may produce one beam or a complex beam pattern of spots and lines on the target surface. For example when both the radiometer and distance unit each include separate laser aiming means to produce a light ring on the target, adjustment aiming data can be processed to provide signals proportional to both distance and energy zone size.

In each embodiment the distance unit or camera can be built into or plugged into the radiometer, loosely attached thereto by a cable or engaged therewith. The components can be separately aimed at the target.

The invention includes measurement devices other than radiometers, such as multi-meters. The optical field of view of instruments, which include a distance measuring component, can be different for each of the component elements and can be narrower than the infrared field of view, for example, for greater precision. The infrared and optical fields of view can be separately adjusted. Temperature and distance reading may be simultaneous or sequential. Multiple or single lasers may be used.

The invention claimed is:

1. Hand-held and hand-directed non-contact temperature measurement system for an energy zone on a remote surface of an object comprising:
   (a) radiometer detector for measurement of invisible infrared radiation, having an optical sub-system including an integral processor means for calculating and for adjustably focusing an invisible infrared image of said energy zone;
   (b) laser directed non-contact sighting means mounted on and coupled to said radiometer to produce a visible aiming display pattern on said surface which identifies to the system user the position, outline and extent of said energy zone for hand-direction of said system;
   (c) distance measurement range-finding sub-system means mounted with and coupled to said optical sub-system and integral processor of said radiometer, which optical sub-system conforms the variable focus optical system of the radiometer to focus upon and to cause the detector field of view to embrace the visible display pattern indicating the measurement area of the energy zone by accessing optical chart data stored in the processor memory of the radiometer and outputting a signal indicating a measured distance between said zone and said detector;
   (d) measurement display means, both on an LCD mounted and coupled with the radiometer, and also separately providing a visible display on the measurement surface, which display means indicates and identifies both the distance between the radiometer and the image of the energy zone on the measurement surface and also the value of the measured temperature; said range-finding sub-system being coupled to said optical sub-system which displays an image determined by said processor from received measured distance signal; including an analog circuit to receive output of the radiometer detector and of the range finder and which includes a processor and digital measurement display to capture a visible energy zone image and indicates the measured temperature, the measured distance and the extent of said energy zone in said optical sub-system visible display.

* * * * *